United States Patent [19]

Nichols et al.

[11] Patent Number: 5,606,719
[45] Date of Patent: Feb. 25, 1997

[54] TEMPORARY STATE PRESERVATION FOR A DISTRIBUTED FILE SERVICE

[75] Inventors: William G. Nichols, Harvard; Dennis E. Phillips, Littleton, both of Mass.

[73] Assignee: Digital Equipment Corporation, Maynard, Mass.

[21] Appl. No.: 473,138

[22] Filed: Jun. 7, 1995

Related U.S. Application Data

[62] Division of Ser. No. 377,670, Jan. 24, 1995, Pat. No. 5,530,905, which is a continuation of Ser. No. 115,354, Sep. 2, 1993, abandoned, which is a continuation of Ser. No. 663,207, Feb. 28, 1991, abandoned, which is a continuation of Ser. No. 198,956, May 26, 1988, abandoned.

[51] Int. Cl.$^6$ ..................................................... G06F 15/16
[52] U.S. Cl. ...................... 395/876; 364/284; 364/284.4; 364/239; 364/DIG. 1; 395/800
[58] Field of Search ..................................... 395/876, 800

[56]           References Cited

U.S. PATENT DOCUMENTS

| | | | |
|---|---|---|---|
| 4,614,841 | 9/1986 | Babecki | 379/98 |
| 4,800,488 | 1/1989 | Agrawal | 395/800 |
| 4,823,122 | 4/1989 | Mann | 340/825.28 |
| 4,893,307 | 1/1990 | McKay | 370/94.1 |
| 4,941,089 | 7/1990 | Fischer | 395/200.01 |

*Primary Examiner*—Eric Coleman
*Attorney, Agent, or Firm*—Fish & Richardson, P.C.

[57]           ABSTRACT

A distributed digital data processing system includes a server and a client that transmit messages over a virtual circuit in a network, the virtual circuit being defined by server virtual circuit information and client virtual circuit information. The server includes a server memory and a server interface. The server includes a server memory and a server interface. The server memory stores server virtual circuit control information and the server interface engages in message transfers over said network using the server virtual circuit control information in said server memory. The client includes a client memory, a client interface, and a purging mechanism. The client memory stores client virtual circuit control information that the client interface uses in connection with message transfers engaged by it over the virtual circuit. The purging mechanism enables the server memory to purge server virtual circuit control information relating to a virtual circuit if said virtual circuit has not been used for a predetermined period of time, thereby freeing up the memory space for server virtual circuit control information relating to other virtual circuits.

6 Claims, 7 Drawing Sheets

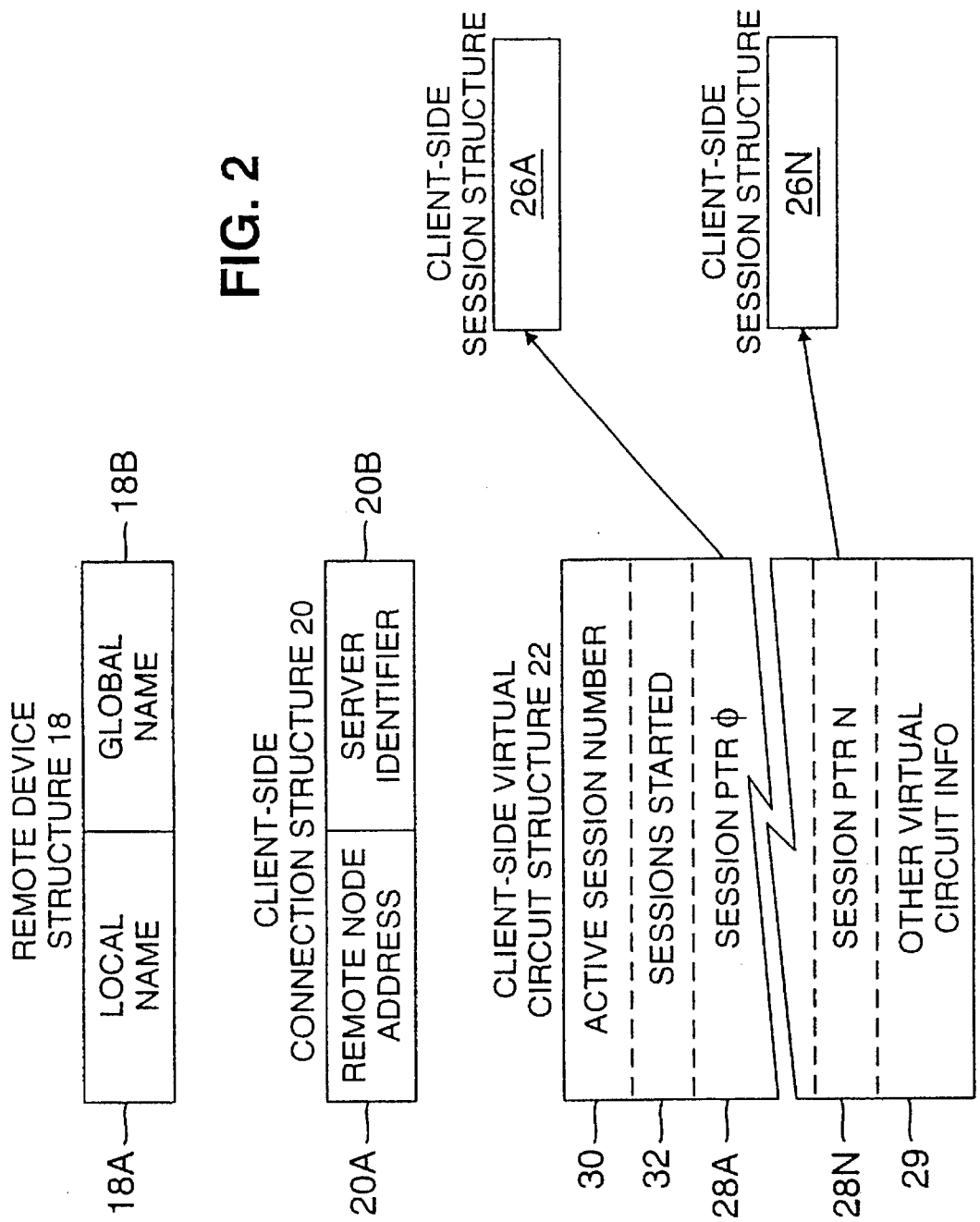

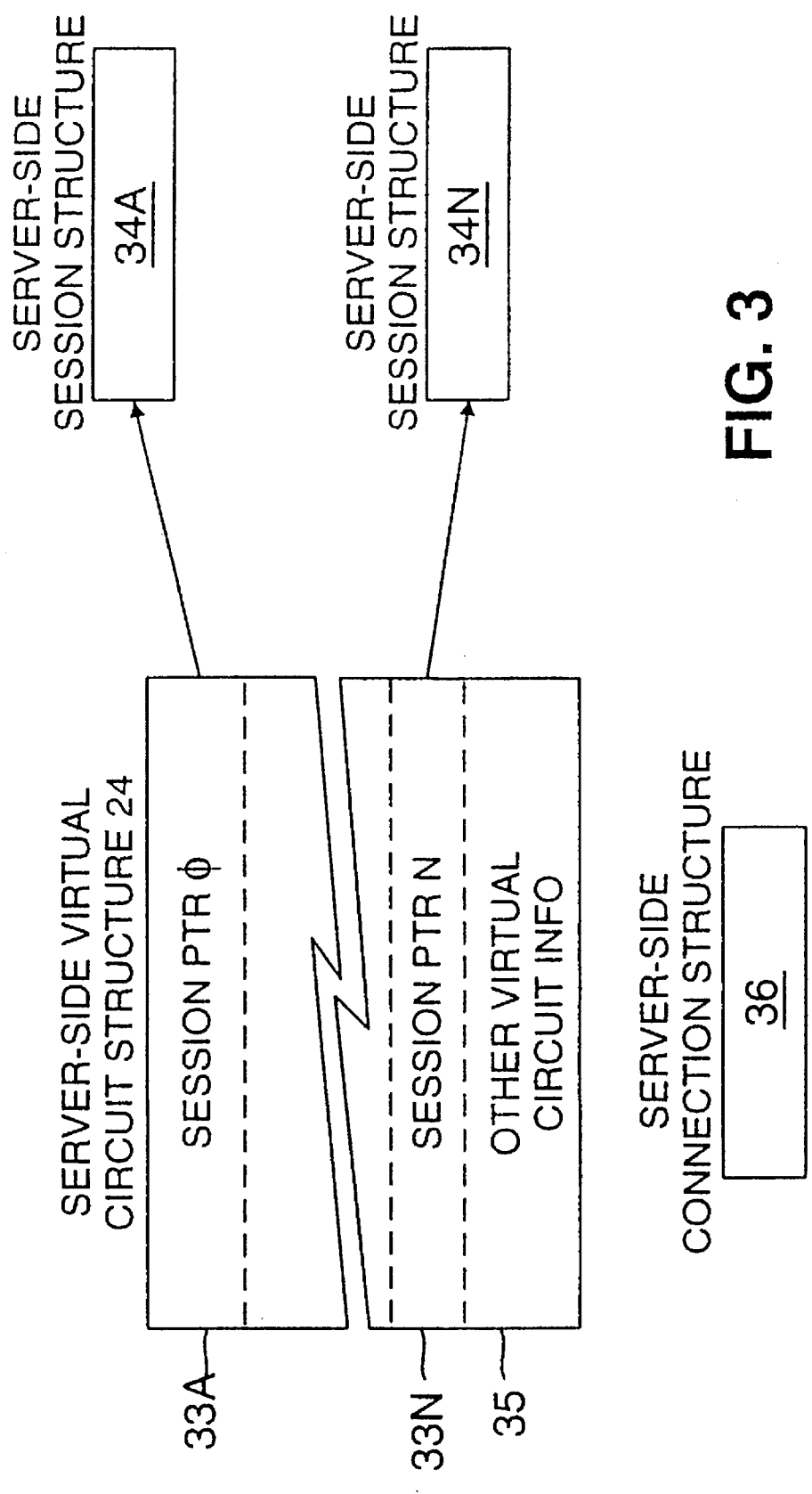

TEMPORARY STATE PRESERVATION FOR A DISTRIBUTED FILE SERVICE

RELATED PATENT APPLICATIONS

This patent application is a divisional application of patent application Ser. No. 08/377,670, filed Jan. 24, 1995 now U.S. Pat. No. 5,530,905 as a continuation under 37 CFR 1.62 of application Ser. No. 08/115,354 filed on Sep. 2, 1993, abandoned which is a continuation of Ser. No. 07/663, 207 filed Feb. 28, 1991, now abandoned, which is a continuation of Ser. No. 07/198,956 filed May 26, 1988 now abandoned.

FIELD OF THE INVENTION

This invention relates generally to the field of distributed computer systems, and, more particularly, to a mechanism for handling distributed file service on such systems.

BACKGROUND OF THE INVENTION

Computer systems have become enormous in size compared to systems of merely a decade ago. It is not uncommon to have hundreds, if not thousands, of work stations or users that communicate over a network. This inevitably implies a distributed architecture in which certain computing functions, such as mass data storage, printing, processing, telecommunications and other data processing services are dispersed among physically distinct computing elements connected to the network at locations remote from the work stations. Thus, for example, instead of having a local device, which is directly connected to or forms part of a particular work station, to perform a function, such as file storage, the system includes a remote storage device which may be shared by all work stations. This not can only provide a cost-effective approach to system design, but also facilitates sharing of data files by a number of users.

Problems arise, however, as the number of work stations increase, in the mechanisms used to control communications among the work stations and the remote devices over the network. Typically, the number of potential users which the remote device can serve is severely limited. This limitation can be more fully appreciated by examining the way in which communications between a work station and a remote device take place. For this purpose, a remote mass storage device will be utilized as an example of the broad class of remote devices which can be attached to the distributed network.

Generally, on a networked system, a remote mass storage device provides shared data storage space or centralized file storage which is accessible to a user connected to the network. The user, sometimes referred to as a client, may be a terminal, a work station, an applications process or another computer. Typically, a file server is provided as an interface between the mass storage device and the network. A network may have many types of servers, each server carries out certain functions on behalf of a client relating to the type of shared resource, such as the printers, telecommunications links, and so forth, that may be connected to it. A file server, for example, controls one or more mass storage devices and coordinates client requests for access to data files sorted on them. When a client requests a specific file located on a remote mass storage device, the server receives the request, identifies which mass storage device contains the file, passes the request to the device, and transfers the retrieved file to the client. For each client seeking access to files on the mass storage device, the server performs this same basic set of functions.

In a distributed system, since the file server and its remote device are neither directly nor physically connected to a client, the client communicates with the server over the network by establishing a virtual circuit effectively allowing it to communication with the device. The virtual circuit, also known as a logical link, is essentially a channel over the network dedicated to handling only the communications between the client and the specific remote device. The virtual circuit effectively makes the remote device appear to the client as though it were a local device physically connected directly to the client and is not shared with other clients. Indeed, as long as the virtual circuit exists, the client has access to the remote device as though it were a local device. Accordingly, the client can open and close files on the remote device as well as read, write, seek on any file located on the remote device.

Typically, a client establishes a virtual circuit with a server by an interchange of messages that essentially divide into two phases. In the first phase, the client identifies and locates the server and the remote device, the client transmits a message to the server over the network that identifies a local name for the remote device, that is, the name by which the remote device is known is generally known in the system. In the second phase, the client and server create the virtual circuit. Since the execution time required to establish the virtual circuit can be large in comparison to the time required to transmit a single message over the virtual circuit, typically the virtual circuit is maintained on a permanent basis; that is, after the virtual circuit is established, it remains until either the client explicitly terminates it be means of another interchange of messages.

While the virtual circuit is being established, both the client and the server create a data structures on their respective sides of the connection. Each data structure contains the identity and location of the device on the other end of the connection as well as information relating to the circuit and rules for communicating over the circuit. The data structures are necessary to maintain the virtual circuit and remain stored in client or server memory for as long as the virtual circuit exists. For each virtual circuit over which a client and a file server communicate there is an associated set of data structures, one on each end of the connection. The process of maintaining the data structure on the server side of the connection is commonly known as "maintaining state." A server which maintains state can and often does provide these protections against interference.

After establishing a virtual circuit, the client gains access to a file on the remote device by opening a session over the circuit. As part of opening a session, both the client and the server create session data structures on their respective sides of the virtual circuit. Typically the session structure on the client side identifies the file, the file operation, the name of the remote device and the virtual circuit, as well as the identity and other information about the client process which has requested the file access. On the server side of the circuit, the session structure typically identifies the client, the file, the status of the file and the number of file operation requests outstanding. For each file being accessed, there is a associated set of session structures, one on each side of the circuit. In addition, both the client and the server add information to their respective virtual circuit data structures identifying the session data structures associated with the sessions that are using the virtual circuit.

As each session is concluded, both sides destroy the associated session structures. When all of the sessions over a particular virtual circuit are closed, then only the original data structure for the virtual circuit remain. The virtual circuit effectively remains intact, awaiting the opening of another session over it. Thus, as noted above, the server maintains state to assure the continued existence of the virtual circuit. An advantage of maintaining state is that the client can quickly and easily access the server whenever it needs to open another file. Since the virtual circuit data structures remain even after the client has ended all sessions over the circuit, the remote device continues to function as though it were a local device and is immediately available to handle the next client session. The time-consuming step of having to re-establish the virtual circuit is eliminated. From the client's viewpoint, this improves efficiency and reduces processing delays associated with having to reestablish the connection with the server.

For this advantage, however, the distributed system pays a significant price. Maintaining state requires a commitment of memory on the server to preserve the relevant data structures. In a distributed system which has thousands of clients, a server may not have enough memory to preserve the virtual circuit data structures for all potential users of the mass storage devices under the server's control. Thus, some clients may not be able to access files through a server until other clients on the system terminate virtual circuits facilitating communications with the server. In short, some clients may be effectively blocked from accessing the mass storage devices.

SUMMARY OF THE INVENTION

The invention provides a new and improved system for facilitating communications on a distributed system including servers and clients that communicate over a network by means of virtual circuits.

In brief summary, the new system includes a server and a client that transmit messages over a virtual circuit in a network, the virtual circuit being defined by server virtual circuit information and client virtual circuit information. The server includes a server memory and a server interface. The server memory stores server virtual circuit control information and the server interface engages in message transfers over said network using the server virtual circuit control information in said server memory. The client includes a client memory, a client interface, and a purging mechanism. The client memory stores client virtual circuit control information that the client interface uses in connection with message transfers engaged by it over the virtual circuit. The purging mechanism enables the server memory to purge server virtual control information relating to a virtual circuit if said virtual circuit has not been sued for a predetermined period of time, thereby freeing up the memory space for server virtual circuit control information relating to other virtual circuits.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 depicts data structures which are created and maintained by a server in the system depicted in FIG. 1 in connection with the invention; and FIG. 3 depicts data structures which are created and maintained by a server in the system depicted in FIG. 1 in connection with the invention.

DETAILED DESCRIPTION OF AN ILLUSTRATIVE EMBODIMENT

A. General Description

Figure 1:
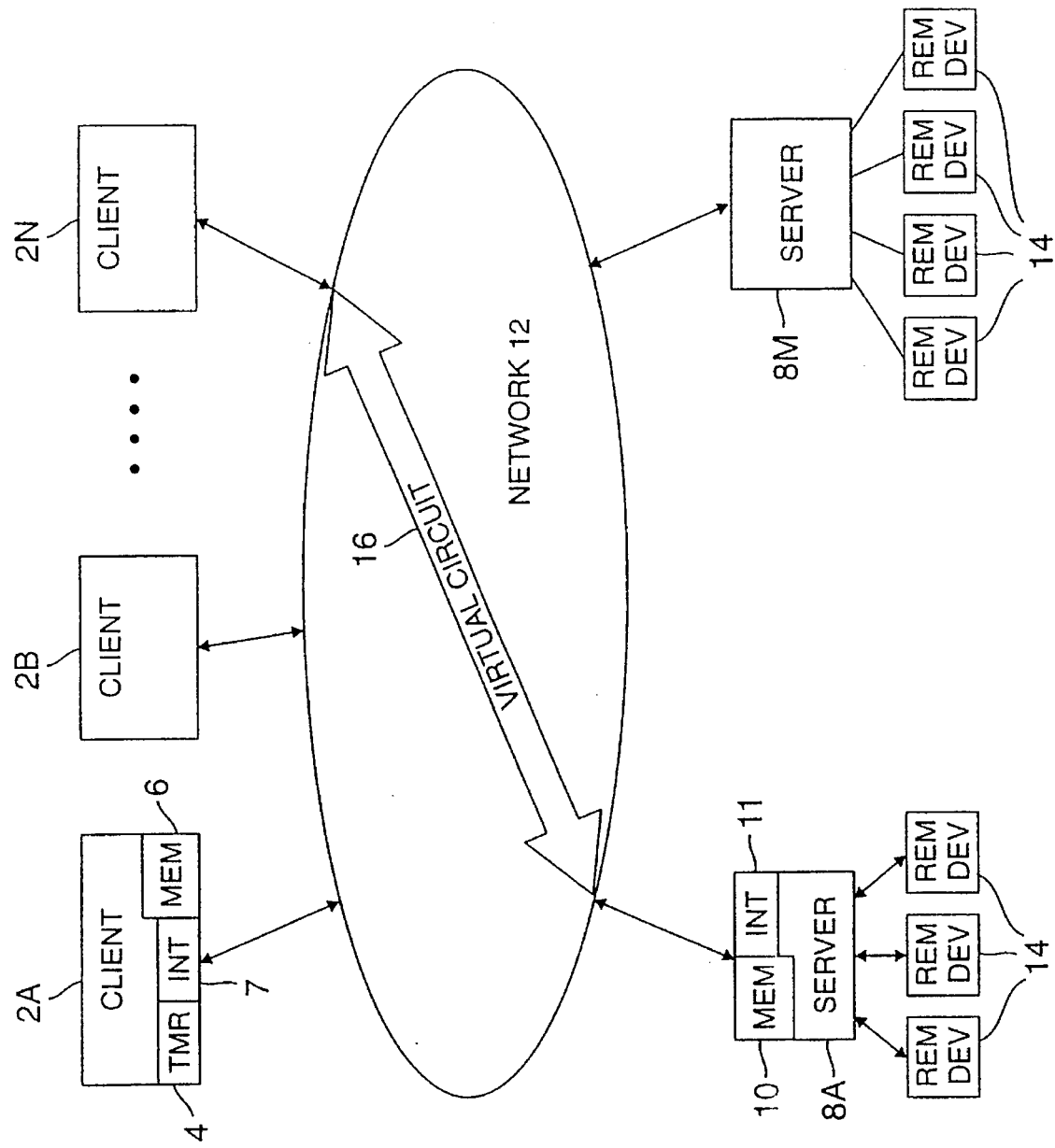
FIG. 1 depicts a distributed digital data processing system constructed in accordance with the invention.

FIG. 1 depicts a distributed digital data processing system constructed in accordance with the invention. The system comprises a plurality of clients 2A through 2N (generally identified by reference numeral 2) a plurality of servers 8A through 8M (generally identified by reference numeral 8) that communicate over a network 12. Each client 2 includes a timer 4, a client memory 6, and a client interface 7. Each server 8 includes a server memory 10 and a server interface 11. Each server 8, in turn, connects to and controls a plurality of remote devices 14, which may comprise, for example, mass storage devices, printers, telecommunications facilities, processors, or other resources which are generally available to all of the clients 2.

The clients 2 and servers 8 communicate over network 12 by means of messages. Each message includes a network identifier that identifies the node, that is, the client 2 or server 8, that is intended to receive the message, as well as the node that transmitted the message. The network 12 also permits the nodes to communicate by means of messages over a virtual circuit 16 that logically interconnects the client 2 and the server 8. Essentially, messages using a virtual circuit include, in addition to the source and destination node indentifiers, a virtual circuit identifier, thereby creating a logical channel dedicated to handling only communications between one specific client 2 and onespecific server 8. While the node identifiers are fixed when the distributed system is set up, the virtual circuits are established dynamically, that is, when a client 2 needs to use a remote device 14 connected to a server 8, by means of a interchange of messages, the client 2 and server 8 establish the virtual circuit 16.

A client 2 and server 8, in particular their respective interfaces 7 and 11, follow a two-phase procedure to establish a virtual circuit 16 over network 12. First, the client interface 7, by an interchange of messages over the network 12, identifies the remote device 14 that has the required file, as well as the server 8 to which the remote device 14 is connected. After the server 8 and remote device 14 have been identified, the client interface 7, buy an interchange of messages over the network 12 with the identified server 8, enables the server interface 11 of the identified server 8 to establish the virtual circuit 16. The virtual circuit 16 is represented by several data structures, described below in connection with FIGS. 2 and 3, maintained by the client interface 7 and server interface 11 It will be appreciated that, prior to establishment of the virtual circuit 16, the messages between the client interface 7 and server interface 11 do not include a virtual circuit identifier, so that the messages are effectively not being transmitted over a virtual circuit 16. However, subsequent communications between the server interface 11 and client interface 7 in connection with the remote device 14 may use the virtual circuit 16. That is, the messages between the client interface 7 and server interface 11 not only identify the client 2 and server 8 as the source and destination, but also the virtual circuit 16.

After a virtual circuit is established between a client 2 and a server 8, the client may access and use the system resources provided by the remote devices 14. Specifically, if a remote device 14 compromise a mass storage device, the client 2 may access one or more files maintained on the mass storage device over the virtual circuit 16. Each file being accessed is treated as a separate communications session. Each session is represented by a session data structure in the respective memories 6 and 10, which structures are also described below in connection with FIGS. 2 and 3. The client 2 and server 8, and, more specifically, the client interface 7 and server interface 11, transmit messages for all of the sessions over the single virtual circuit 16.

When a client 2 no longer needs to access a file, it closes the session that it used in accessing the file by an exchange of messages with the server 8. In closing a session, the client interface 7 and server interface 11 purge their respective memories 6 and 10 of the session data structures associated with the session. In addition, if the client 2 has eliminated all sessions with a server 8, and does not start any new sessions within a predetermined amount of time, it also closes the virtual circuit 16 with the server 8. In closing the virtual circuit 16, the server interface 11 purges the data structures that it maintains therefor in its memory 10

Similarly, during closing of the virtual circuit 165, the client interface 7 purges most of the data structures which it maintains in the client memory 6 relating to the virtual circuit. The client interface 7 retains the information obtained during the first phase of the establishment of the virtual circuit 16, that is, the identification of the remote device 14 that had the required file, as well as the server 8 to which the remotedevice 14 is connected. This reduces the time required to reestablish the virtual circuit if a virtual circuit is again needed for communications with the same server 8, since the client need not then engage in the first phase of virtual circuit establishment described above.

It will be appreciated that, by purging the data structures relating to the virtual circuit 16 in the memory 10 of server 8, memory is freed up which can be used for data structures for other virtual circuits. In a large distributed system, that includes a large number of clients 2 that may need to access a server 8, requiring the servers 8 to maintain these data structures for virtual circuits, including those that have not had any open sessions for a substantial period of time may effectively may require the server 8 to be provided with increased amounts of memory at increased cost to reduce the likelihood of blocking.

B. Specific Discussion

1. Data Structures

To support communications over the virtual circuit 16, both the client interface 7 and the server interface 11 create certain data structures in their respective memories 6 and 10. Specifically, the client interface 7 establishes and maintains three data structures, including a remote device structure 18, a client-side connection structure 10 and a client-side virtual circuit structure 22, all of which are shown in FIG. 2. The server interface 11 establishes and maintains a server-side virtual circuit structure 24 and a server-side connection structure 36, both of which are shown in FIG. 3.

With reference to FIG. 2, the remote device structure 18 contains two fields, including a local name field 18A contains a global name field 18B. The local name field 18A contains a local name associated with the remote device 14, that is, the name for the remote device 14 that is used by processes and applications that are running on the client 2. The global name field 18B contains a global name associated with the remote device, that identifies the remote the device 14 for transmissions over the network. The information in the remote device structure 18 allows the client 22 to effectively make the remote device 114 appear to applications and processes running on the client 2 as though it were a local device.

The client-side connection structure 20 includes a remote node address field 20A and a server identifier field 20B that contains information that assists the client interface 7 to locate the remote device 14 when establishing the virtual circuit 16. The client-side connection structure 20 includes a remote node address field 20A that contains the address of the server 8 on network 12, and a server identifier field 20B that contains a name that identifies the server 8. The contents of the fields 20A and 20B are used by the client interface 7 in determining the address for message transmissions over network 12, of the server 8.

The client-side virtual circuit structure 22 contains a number of fields containing information for use in monitoring and controlling transmissions over the virtual circuit 16. In particular, the client-side virtual circuit structure 223 includes one or more session pointer fields 28A through 28N (generally identified by reference numeral 28) each of which points to an associated client-side session structure generally identified by reference numeral 26, which will be described in, detail below. In addition, the client-side virtual circuit structure 22 includes an active sessions number field whose contents identify the number of activesessions, that is, the number of session pointer fields 28A currently maintained in the client side virtual circuit structure 22. A client-side sessions started field 32 is used in conjunction with timer 4 (FIG. 1) as described below. Finally, the client-side virtual circuit structure 22 also contains a field 29 for other information that is useful in facilitating communications using a virtual circuit 16, including information as the physical address of the server on the network 12, the number of buffers available to store messages, sequence numbers for the messages being exchanged between the server 8 and the client 2, as well as information relating to the maintenance of the virtual circuit 16. The client interface 7 maintains the client-side virtual circuit structure 22 generally for as long as the virtual circuit exists.

As noted above, the client-side virtual circuit structure includes one or more session pointer fields 28, each of which identifies a session. Each session, in turn, is associated with a file that the client 2 is currently accessing through the server 8. All of the messages relating to all of the sessions engaged in by a client 2 and server 8 may be transferred in multiplexed fashion using the single virtual circuit 16. The client-side session structures 26 contain information, such as local and remote session identifiers, file identifiers, virtual circuit identifiers identifying the virtual circuit over which the file is being accessed, information indicating whether the file is open or closed and information identifying the number of outstanding file operation requests. For each file that the client 2 opens over the virtual circuit, the client initiates a separate session with a corresponding client-side session structure 26 To facilitate communications over the virtual circuit 16, the server interface 11 maintains, in the server's memory, 10, a server-side virtual circuit structure 24, one or more server-side session structures 34, and a server-side connection structure 36. Like its counterpart on the client side, the server-side virtual circuit structure 24 also assists in facilitating communications over the virtual circuit 16. The server interface 11 maintains the server-side virtual circuit structure 24 as long as the virtual circuit exists is commonly referred to as "maintaining state".

In general, the server-side virtual circuit structure 24 contains information similar to that found in the client-side virtual circuit structure 22 and it serves a similar function. More specifically, the server-side virtual circuit structure 24 includes one or more session pointer fields 33A through 33N (generally identified by reference numeral 33), each containing a pointer to a server side session structure 34A through 33N (generally identified by reference numeral 34). Each server-side session structure 34 identifies the client and the file which the client has open.

The server-side connection structure 36 contains information that is used to achieve the orderly closing of open files in the event that the virtual circuit 16 is unintentionally interrupted. The server-side connection structure 36 includes the identity of the client 2, its location and pointers to server-side session structures for the various sessions associated with each open file.

The server 8 also enables each remote device 14 to create another data structure (not shown) that assists in minimizing conflicts among file access requests from various clients 2. Such a conflict may arise, for example, if one client 2 transmits an access request to delete a file that another client 2 is currently accessing.

2. Operation

Figure 4A:
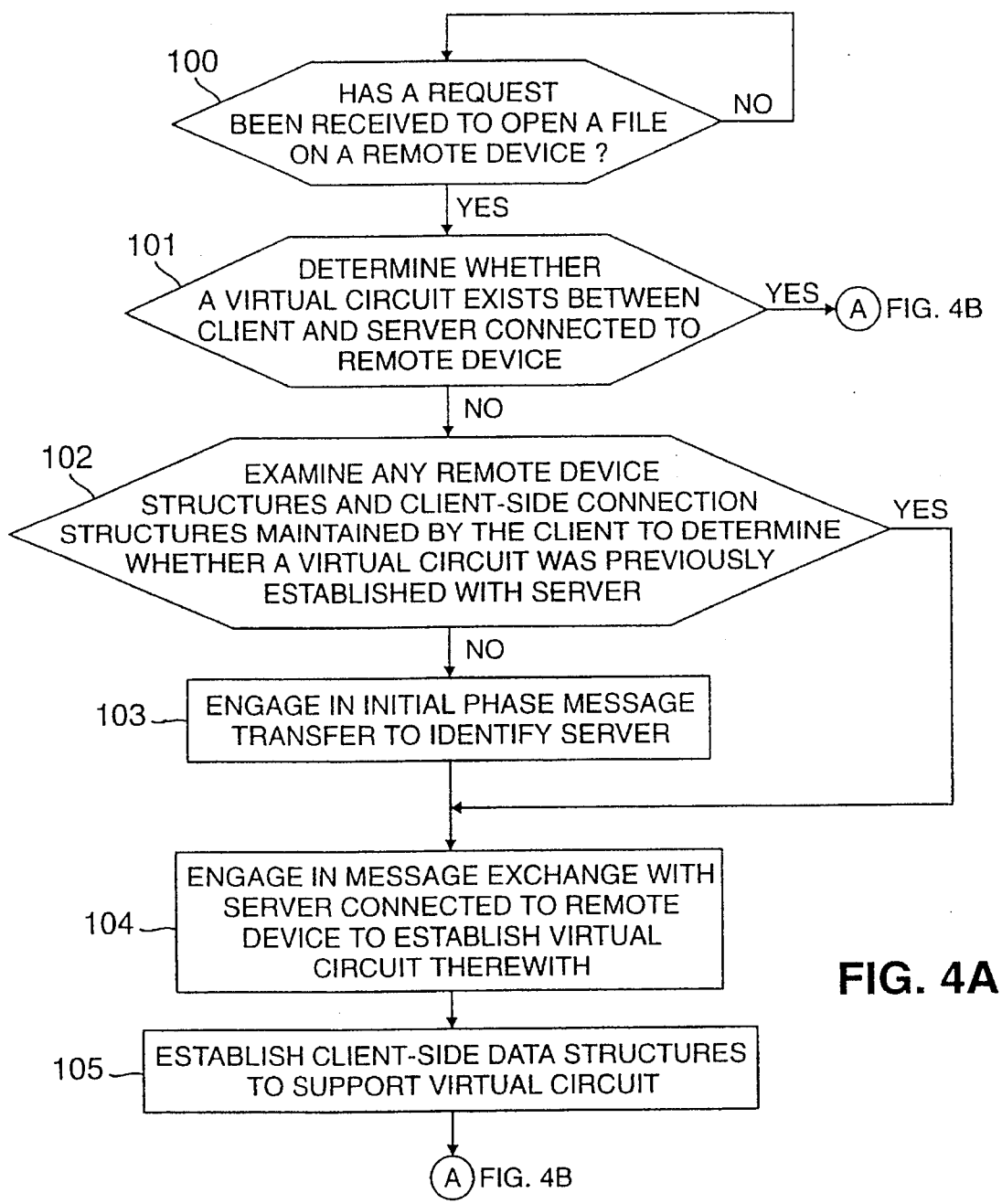
FIGS. 4A, 4B, 4C, 4D depict flow; diagrams useful in understanding the operation performed by a client and a server in the system depicted in FIG. 1.

The operation performed by the client 2, and specifically the client interface 7, will be described in connection with FIGS. 4A through 4D. The operations are generally divided into four categories, including virtual circuit establishment depicted in FIG. 4A, session establishment depicted in FIG. 4B, session closing depicted in FIG. 4C, and virtual circuit closing depicted in FIG. 4D. With reference to FIG. 4A, when a process or applications program run by the client 2 needs to initially access a file, it generates a request identifying the file, which it transmits to the client interface 7 (step 100). When the client interface receives such a request it first determines, from the contents of the remote device structure and the client-side connection structure 20, whether a virtual circuit 16 has been established to a server 8 connected to a remote device 14 which maintains the file (step 101). If so, the client interface 7 steps to the sequence depicted on FIG. 4B to establish a session to open the file and facilitate accessing of the file by the process or application program.

If, on the other hand, the client interface 7 determines in step 101 that a virtual circuit does not exist between the client 2 and the server 8 connected to the remote device 14 that maintains the required file, it steps to a sequence to set up such a virtual circuit. Initially, it determines, from the remote device structure 18 and client-side connection structure 20, whether a virtual circuit 16 was previously established to the server 8 (step 103, in which it engages in message transfers over the network 12 to perform the initial phase of virtual circuit establishment, as described above (step 103). As noted above, in the initial phase, the client interface identifies the remote device 14 which includes the requested file and the server 8 connected thereto.

Following step 103, or step 102 if the client interface 7 determines that a virtual circuit 16 was previously established to the server 8, the client interface 7 engages in the second phase of virtual circuit establishment as described above. In that phase, the client interface 7 engages in a message interchange with the server interface 11 of the identified server 8 to establish the virtual circuit 16 (step 104) and the client side data structures 18, 20 and 22, if any have not been previously established to support the virtual circuit. The client interface then steps to the sequence depicted in FIG. 4B to establish a session allowing the process or applications program to access the requested file.

Figure 4B:
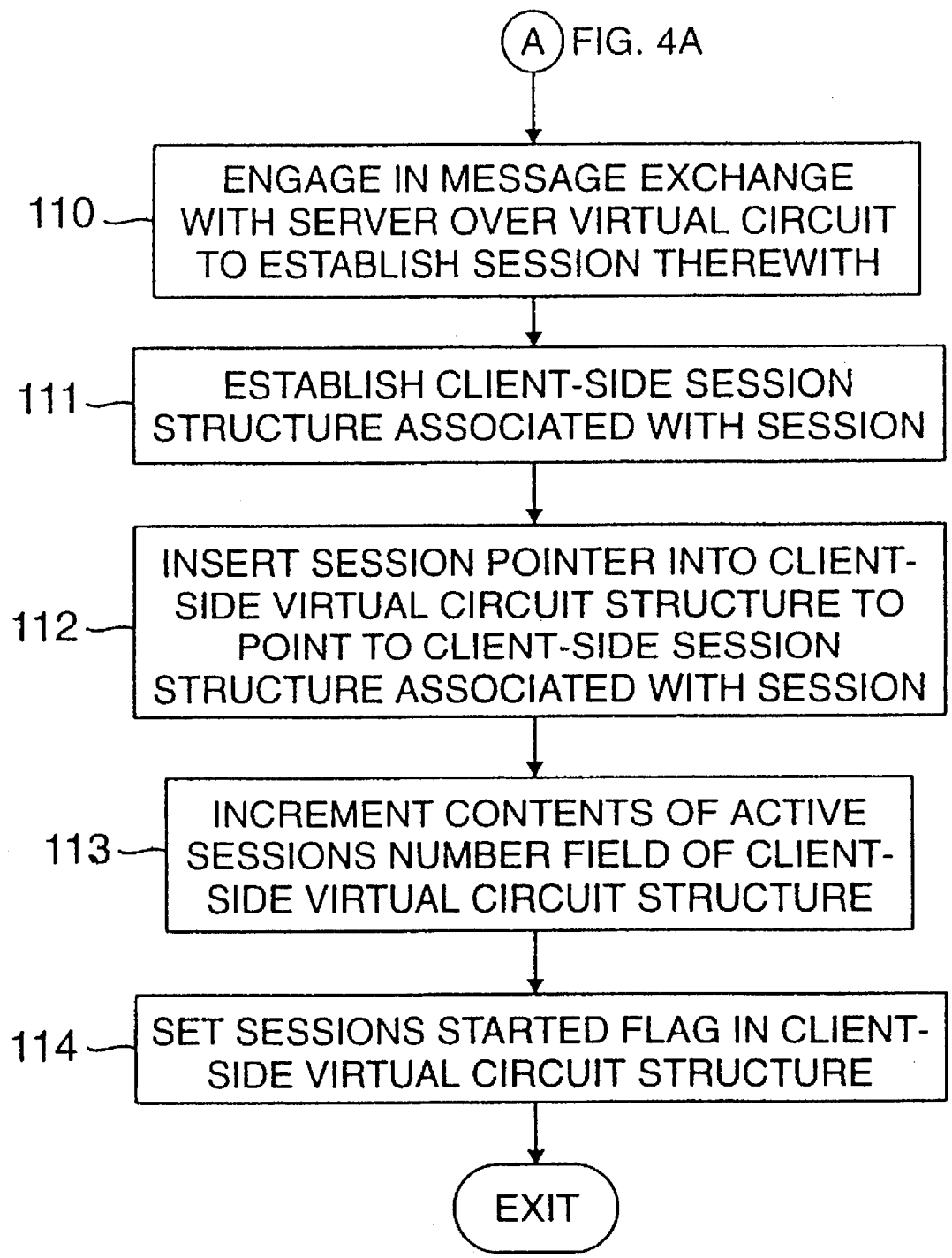

After the client interface 7 has established a virtual circuit 16, it performs the sequence depicted in FIG. 4B to establish a session. This may occur automatically after establishment of the virtual circuit, or, alternatively, it may occur in response to an explicit command from the process or applications program requiring access to the file. In any event, to establish a session the client interface 7 initially engages in a message exchange with the server 8 over the virtual circuit to establish the session with the server interface 11 (step 110). The client interface 7 then establishes the client-side session structure 26 associated with the session (step 111) and inserts a pointer to the client-side structure 26 into a session pointer field 28 (step 112). It will be appreciated that the server interface 11 will contemporaneously be establishing a server-side session structure 34 and inserting a pointer thereto into a session pointer field 33 in the server side virtual circuit structure 24. Following step 112, the client interface increments the contents of the active sessions number field 30 (step 113) and sets the sessions started flag 32 in the client-side virtual circuit structure 22 (step 114) associated with the virtual circuit 16.

Following the sequence depicted in FIG. 4B, the process or applications program may access the required file, by means of messages interchanged by the client interface 7 and server interface 11, over the virtual circuit 16.

Figure 4C:
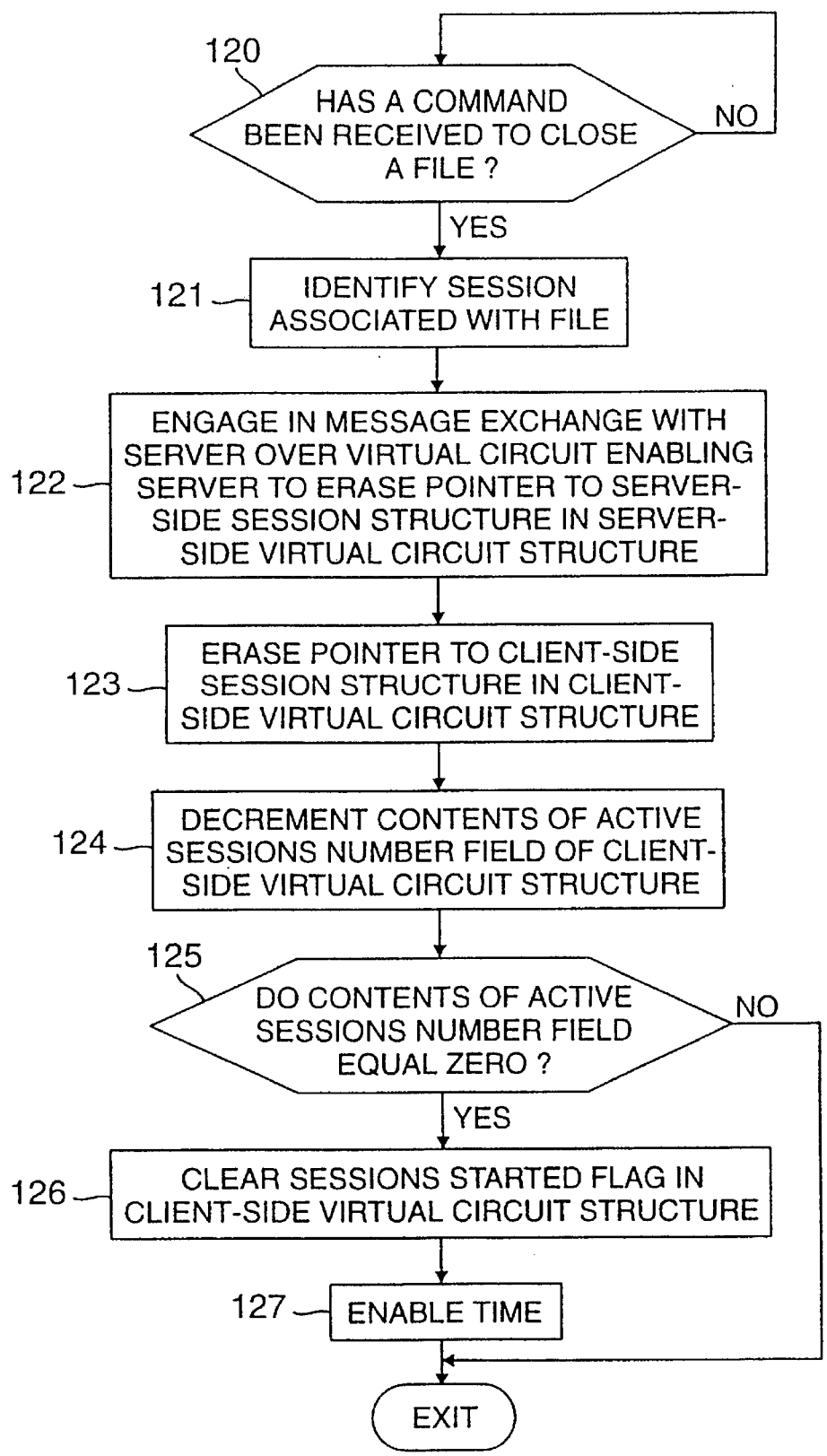

When a process or applications program no longer needs access to a file, it may generate a command to close the session used to access the file. The client interface 7 receives the close session command and performs the operations depicted on FIG. 4C in response thereto. With reference to FIG. 4C, in response to the close session command (step 120), the client interface 7 identifies the session associated with the file (step 121) and engages in an exchange of messages with the server interface 11 to enable the server interface 11 to purge the session pointer 33 relating to the session from the server-side virtual circuit structure (step 122). The client interface then purges the session pointer 28 in its client-side virtual circuit structure (step 123), which has the result of effectively closing the sessions structure 26 and the server-side session structure 34, respectively, is thereafter no longer available to the client interface 7 and server interface 11.

After the client interface 7 has eliminated the session pointer 28 relating to the session from its client-side virtual circuit structure 22, it decrements the contents of the active sessions number field 30 to identify the number of currently active sessions with session pointers 28 in the client-side virtual circuit structure 2 (step 124) and tests the contents of the active sessions number field 30 to determine whether they equal zero (step 125).

If, in step 125, the client interface 7 determines that the contents of the active sessions number 30 do not equal zero, that is, if at least one session is open over the virtual circuit 16, the client interface 7 exits the sequence depicted on FIG. 4C. On the other hand, if, in step 125, the client interface 7 determines that the contents of the active sessions number field 30 equal zero, it clears the sessions started flag 32 (step 126), starts the timer 6 (step 127), and thereafter exists the sequence. If the timer 6 is already started in step 127, which can occur if the opening and closing of the session occurs after the previous closing of a session resulting in clearing of the sessions started flag and starting of timer 6, but before the timing out of the timer 6, the client interface 7 restarts the timer 6, thus enabling the timing interval measured by the timer 6 from the closing of the second session.

Figure 4D:
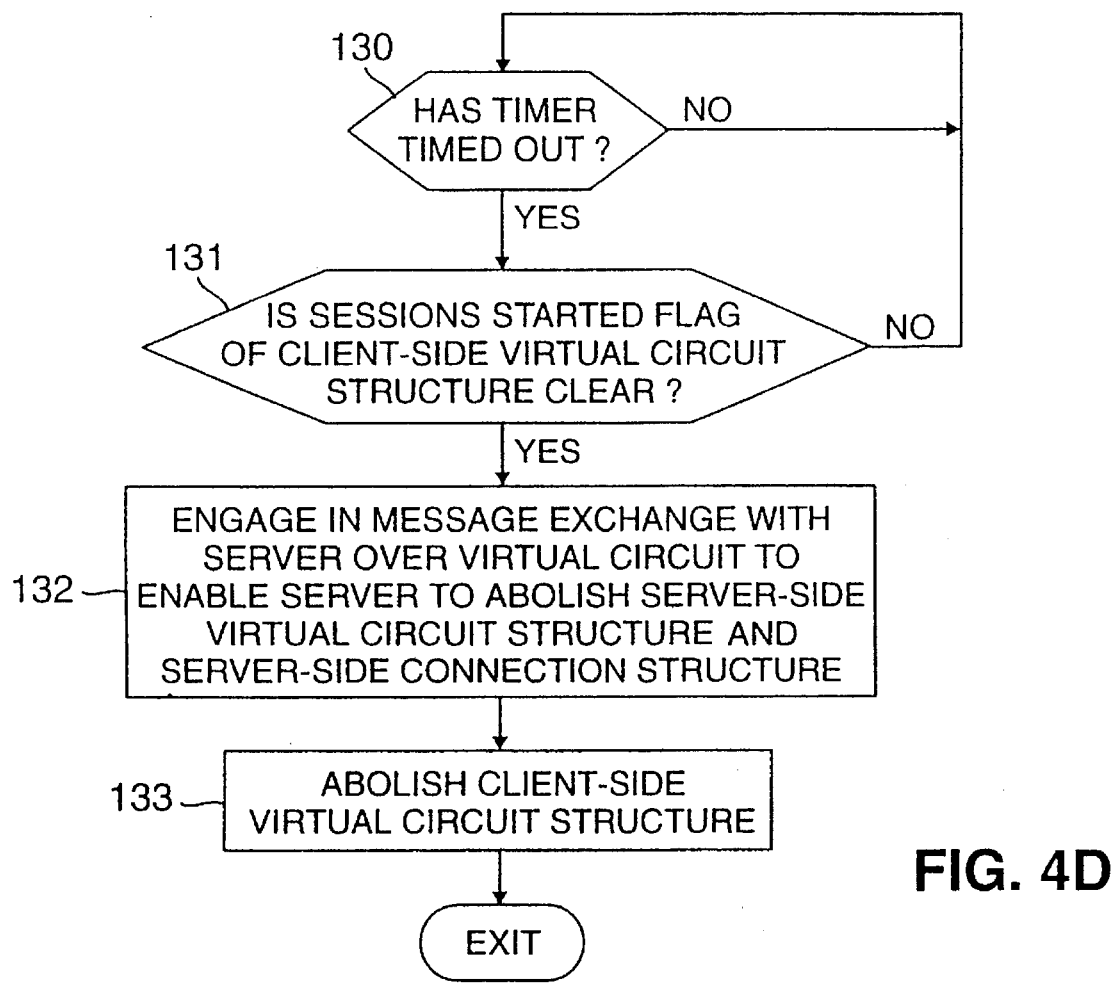

The operations of the client interface 7 in response to timing out of the timer 6 are depicted in FIG. 4D. With reference to FIG. 4D, when the timer 6 times out (step 130), the client interface 7 checks the condition of the sessions started flag 32 in its client-side virtual circuit structure 22 (step 131). If a session has been started since the timer 6 was started, the sessions started flag 32 would have been set in step 111 (FIG. 4B) during establishment of the session. Thus, if the client interface 7 determines in step 131 that the sessions started flag 32 is set, a session has been started since the enablement of the timer, and so it returns to step 130.

On the other hand, if the client interface 7 determines in step 131 that the sessions started flag 32 is clear, the virtual circuit 16 is deemed to not be in use, and so the client interface 7 initiates a message exchange with the server interface 11 to close the virtual circuit 16 (step 132). The message exchange enables the server interface 11 to purge the server-side virtual circuit structure 24 and the server-side connection structure 36, thereby freeing up space in the server memory 10 for other uses, including virtual circuits and sessions with other clients 2. Thereafter, the client 2 purges the client-side virtual circuit structure 22 (step 133) from its memory 6. The client retains the remote device structure 18 and client side connection structure 20, whose contents can be used if a virtual circuit 16 is later required to the same server, to reduce the message exchange required to open the virtual circuit.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and, desired to be secured by Letters Patent of the United States is:

1. A distributed digital data processing system including a server and a client that transmit messages over a network,
   A. said server including:
      i. server memory means for storing server message transfer control information, said server message transfer control information including server virtual circuit control information and server sessions control information;
      ii. server interface means for engaging in message transfers over said network using the server message transfer control information in said server memory means;
   B. said client including:
      i. client memory means for storing client message transfer control information, said client virtual circuit control information and client sessions control comprising:
      ii. client interface means comprising:
         (a) client message transfer means for engaging in message transfers over said network using the client message transfer control information in said client memory means;
         (b) virtual circuit information control means for conditioning client virtual circuit control information in said client memory means and for enabling said client message transfer means to engage in an exchange of messages to enable said server interface means to condition server virtual circuit control information in said server memory means, said client virtual circuit control information and said server virtual circuit control information jointly serving to define a virtual circuit;
         (c) session information control means for conditioning client session control information in said client memory means in connection with client virtual circuit control information in said client memory means, and for enabling said client message transfer means to engage in an exchange of messages to enable said server interface means to condition server session control information in said server memory means in connection with server virtual circuit control information in said server memory means, said server session control information and said client session control information jointly serving to define a session defined in connection with a virtual circuit;
         (d) session timing means for determining when a virtual circuit has had no sessions defined in connection with the virtual circuit for a predetermined period of time; and
         (e) means responsive to a positive determination by said session timing means in connection with a virtual circuit for enabling said client message transfer means to transfer a message to enable said server interface means to eliminate said server virtual circuit control information relating to said virtual circuit.

2. A system as defined in claim 1 wherein:
   A. said client virtual circuit control information includes session number identification means for identifying the number of sessions defined in connection with the virtual circuit and an active sessions flag;
   B. said session information control means conditioning said active sessions flag to a set condition when defining a session over the virtual circuit and to a clear condition when closing the last session defined over the virtual circuit;
   C. said session timing means includes:
      i. timer means for identifying the end of a predetermined timing interval;
      ii. timer control means responsive to the clearing of said active sessions flag for starting said timer means; and
      iii. determination means for generating a positive determination if said active sessions flag is set in response to the timing out of said timer means.

3. A distributed digital data processing system including a server and a client that transmit messages over a network,
   A. said server including:
      i. server memory means for storing server message transfer control information, said server message transfer control information including server virtual circuit control information and server session control information;
      ii. server interface means for engaging in message transfers over said network using the server message transfer control information in said server memory means;
   B. said client including:
      i. client memory means for storing client message transfer control information, said client message transfer control information including client virtual circuit control information including session number identification means for identifying the number of sessions defined in connection with the virtual circuit and an active sessions flag, and client session control information;

ii. client interface means comprising:
  (a) client message transfer means for engaging in message transfer over said network using the client message transfer control information in said client memory means;
  (b) virtual circuit information control means for conditioning client virtual circuit control information in said client memory means and for enabling said client message transfer means to engage in an exchange of messages to enable said server interface means to condition server virtual circuit control information in said server memory means, said client virtual circuit control information and said server virtual circuit control information jointly serving to define a virtual circuit;
  (c) session information control means for conditioning client session control information in said client memory means in connection with client virtual circuit control information in said client memory means, and for enabling said client message transfer means to engage in an exchange of messages to enable said server interface means to condition server session control information in said server memory means in connection with server virtual circuit control information in said server memory means, said server session control information and said client session control information jointly serving to define a session defined in connection with a virtual circuit, said session information control means conditioning said active sessions flag to a set condition when defining a session over the virtual circuit and to a clear condition when closing the last session defined over the virtual circuit;
  (d) session timing means including:
    I. timer means for identifying the end of a predetermined timing interval;
    II. timer control means responsive to the clearing of said active sessions flag for starting said timer means; and
    III. determination means for generating a positive determination if said active sessions flag is set in response to the timing out of said timer means; and
  (e) means responsive to a positive determination by said session timing means in connection with a virtual circuit for enabling said client message transfer means to transfer a message to enable said server interface means to eliminate said server virtual circuit control information relating to said virtual circuit.

4. A client for use in a distributed digital data processing system including a server, the client and server transmitting messages over a network, the server including server memory means for storing server message transfer control information, said server message transfer control information including server virtual circuit control information and server session control information and server interface means for engaging in message transfers over said network using the server message transfer control information in said server memory means, said client including:

A client memory means for storing client message transfer control information, said client message transfer control information including client virtual circuit control information and client session control information;

B. client interface means comprising:
  i. client message transfer means for engaging in message transfers over said network using the client message transfer control information is said client memory means;
  ii. virtual circuit information control means for conditioning client virtual circuit control information in said client memory means and for enabling said client message transfer means to engage in an exchange of messages to enable said server interface means to condition server virtual circuit control information in said server memory means, said client virtual circuit control information and said server virtual circuit control information jointly serving to define a virtual circuit;
  iii. session information control means for conditioning client session control information in said client memory means in connection with client virtual circuit control information in said client memory means, and for enabling said client message transfer means to engage in an exchange of messages to enable said server interface means to condition server session control information in said server memory means in connection with server virtual circuit control information and said client session control information jointly serving to define a session defined in connection with a virtual circuit;
  iv. session timing means for determining when a virtual circuit has had no sessions defined in connection with the virtual circuit for a predetermined period of time; and
  v. means responsive to a positive determination by said session timing means in connection with a virtual circuit for enabling said client message transfer means to transfer a message to enable said server interface means to eliminate said server virtual circuit control information relating to said virtual circuit.

5. A system as defined in claim 4 wherein:
A. said client virtual circuit control information includes session number identification means for identifying the number of sessions defined in connection with the virtual circuit and an active sessions flag;
B. said session information control means conditioning said active sessions flag to a set condition when defining a session over the virtual circuit and to a clear condition when closing the last session defined over the virtual circuit;
C. said session timing means includes:
  i. timer means for identifying the end of a predetermined timing interval;
  ii. timer control means responsive to the clearing of said active sessions flag for starting said timer means; and
  iii. determination means for generating a positive determination if said active sessions flag is set in response to the timing out of said timer means.

6. A client for use in a distributed digital data processing system including a server, the client and server transmitting messages for storing server message transfer control information, said server message transfer control information including server virtual circuit control information and server session control information and server interface means for engaging in message transfers over said network using the server message transfer control information in said server memory means said client including:

A. client memory means for storing client message transfer control information, said client message transfer control information including client virtual circuit control information including session number identification means for identifying the number of sessions defined in connection with the virtual circuit and an active sessions flag, and client session control information;

B. client interface means comprising:
   i. client message transfer means for engaging in message transfers over said network using the client message transfer control information in said client memory means;
   ii. virtual circuit information control means for conditioning client virtual circuit control information in said client memory means and for enabling said client message transfer means to engage in an exchange of messages to enable said server interface means to condition server virtual circuit control information in said server memory means, said client virtual circuit control information and said server virtual circuit control information jointly serving to define a virtual circuit;
   iii. session information control means for conditioning client session control information in said client memory means in connection with client virtual circuit control information in said client memory means, and for enabling said client message transfer means to engage in an exchange of messages to enable said server interface means to condition server session control information in said server memory means in connection with server virtual circuit control information in said server memory means, said server session control information and said client session control information jointly serving to define a session defined in connection with a virtual circuit, said session information control means conditioning said active sessions flag to a set condition when defining a session over the virtual circuit and to a clear when closing the last sessions defined over the virtual circuit;
   iv. session timing means including:
      (a) timer means for identifying the end of a predetermined timing interval;
      (b) timer control means responsive to the clearing of said active sessions flag for starting said timer means; and
      (c) determination means for generating a positive determination if said active sessions flag is set in response to the timing out of said timer means; and
   v. means responsive to a positive determination by said session timing means in connection with a virtual circuit for enabling said client message transfer means to transfer a message to enable said server interface means to eliminate said server virtual circuit control information relating to said virtual circuit.

* * * * *